United States Patent
Smith et al.

(10) Patent No.: US 8,770,861 B2
(45) Date of Patent: Jul. 8, 2014

(54) OUTSIDE PLANT TERMINATION ENCLOSURE

(71) Applicants: Trevor D. Smith, Eden Prairie, MN (US); David Braga, Raleigh, NC (US); Eric E. Alston, Fuquay-Varina, NC (US); Daniel B. Hangebrauck, Garner, NC (US); Christopher Brian Barefoot, Erwin, NC (US)

(72) Inventors: Trevor D. Smith, Eden Prairie, MN (US); David Braga, Raleigh, NC (US); Eric E. Alston, Fuquay-Varina, NC (US); Daniel B. Hangebrauck, Garner, NC (US); Christopher Brian Barefoot, Erwin, NC (US)

(73) Assignees: Tyco Electronics Corporation, Berwyn, PA (US); ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 13/628,545

(22) Filed: Sep. 27, 2012

(65) Prior Publication Data

US 2013/0114930 A1    May 9, 2013

Related U.S. Application Data

(60) Provisional application No. 61/539,851, filed on Sep. 27, 2011.

(51) Int. Cl.
*G02B 6/36* (2006.01)
*G02B 6/00* (2006.01)

(52) U.S. Cl.
USPC .......................................... 385/76; 385/135

(58) Field of Classification Search
USPC ........................................................ 385/135
See application file for complete search history.

(56) References Cited

U.S. PATENT DOCUMENTS

| | | |
|---|---|---|
| 4,359,262 A | 11/1982 | Dolan |
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,699,455 A | 10/1987 | Erbe et al. |
| 4,708,430 A | 11/1987 | Donaldson et al. |
| 4,717,231 A | 1/1988 | Dewez et al. |

(Continued)

FOREIGN PATENT DOCUMENTS

| | | |
|---|---|---|
| AU | 40995/85 | 4/1985 |
| AU | 55314/86 | 3/1986 |

(Continued)

OTHER PUBLICATIONS

"ADC OMX 600 Optical Distribution Frame Solution," *ADC Telecommunications, Inc.*, Publication No. 856, 8 pgs. (Feb. 2000).

(Continued)

*Primary Examiner* — Omar Rojas
(74) *Attorney, Agent, or Firm* — Merchant & Gould P.C.

(57) ABSTRACT

A termination enclosure includes a base, a cover, and at least one optical component. An input member extends outwardly from the base. At least a portion of the input member extends along the bottom of the termination enclosure. The input member defines a sealed input passage that extends through the base. A sealing chamber is defined by the base and cover. A gasket disposed at the sealing chamber seals and/or retains drop cables routed into the enclosure even when the cover is moved relative to the base. The sealing chamber defines ports that are located on a common side of the enclosure as an end of the input member.

20 Claims, 7 Drawing Sheets

(56) References Cited

U.S. PATENT DOCUMENTS

| | | |
|---|---|---|
| 4,747,020 A | 5/1988 | Brickley et al. |
| 4,765,710 A | 8/1988 | Burneister et al. |
| 4,792,203 A | 12/1988 | Nelson et al. |
| 4,971,421 A | 11/1990 | Ori |
| 4,986,762 A | 1/1991 | Keith |
| 4,995,688 A | 2/1991 | Anton et al. |
| 5,067,784 A | 11/1991 | Debortoli et al. |
| 5,071,211 A | 12/1991 | Debortoli et al. |
| 5,100,221 A | 3/1992 | Carney et al. |
| 5,129,030 A | 7/1992 | Petrunia |
| 5,138,688 A | 8/1992 | Debortoli |
| 5,142,606 A | 8/1992 | Carney et al. |
| 5,160,188 A | 11/1992 | Rorke et al. |
| 5,167,001 A | 11/1992 | Debortoli et al. |
| 5,179,618 A | 1/1993 | Anton |
| 5,289,558 A | 2/1994 | Teichler et al. |
| 5,313,546 A * | 5/1994 | Toffetti ........................ 385/135 |
| 5,317,663 A | 5/1994 | Beard et al. |
| 5,318,259 A | 6/1994 | Fussler |
| 5,335,349 A | 8/1994 | Kutsch et al. |
| 5,353,367 A | 10/1994 | Czosnowski et al. |
| 5,363,465 A | 11/1994 | Korkowski et al. |
| 5,363,467 A | 11/1994 | Keith |
| 5,402,515 A | 3/1995 | Vidacovich |
| RE34,955 E | 5/1995 | Anton et al. |
| 5,412,751 A | 5/1995 | Siemon et al. |
| 5,432,875 A | 7/1995 | Korkowski et al. |
| 5,490,229 A | 2/1996 | Ghandeharizadeh et al. |
| 5,497,444 A | 3/1996 | Wheeler |
| 5,511,144 A | 4/1996 | Hawkins et al. |
| 5,570,450 A | 10/1996 | Fernandez et al. |
| 5,689,604 A | 11/1997 | Janus et al. |
| 5,717,810 A | 2/1998 | Wheeler |
| 5,734,776 A | 3/1998 | Puetz |
| 5,758,002 A | 5/1998 | Walters |
| 5,758,003 A | 5/1998 | Wheeler et al. |
| 5,774,245 A | 6/1998 | Baker |
| 5,903,698 A | 5/1999 | Poremba et al. |
| 5,966,492 A | 10/1999 | Bechamps et al. |
| 6,044,193 A | 3/2000 | Szentesi et al. |
| 6,097,872 A | 8/2000 | Kusuda et al. |
| 6,236,795 B1 | 5/2001 | Rodgers |
| 6,360,050 B1 | 3/2002 | Moua et al. |
| 6,424,781 B1 | 7/2002 | Puetz et al. |
| 6,535,682 B1 | 3/2003 | Puetz et al. |
| 6,556,763 B1 | 4/2003 | Puetz et al. |
| 6,591,051 B2 | 7/2003 | Solheid et al. |
| 6,631,237 B2 | 10/2003 | Knudsen et al. |
| RE38,311 E | 11/2003 | Wheeler |
| 6,760,531 B1 | 7/2004 | Solheid et al. |
| 6,793,517 B2 | 9/2004 | Neer et al. |
| 6,850,685 B2 | 2/2005 | Tinucci et al. |
| 6,888,069 B1 | 5/2005 | Chen et al. |
| 6,920,274 B2 | 7/2005 | Rapp et al. |
| 6,937,800 B2 | 8/2005 | Cote |
| 7,142,765 B2 | 11/2006 | Rapp et al. |
| 7,346,254 B2 | 3/2008 | Kramer et al. |
| 7,367,823 B2 | 5/2008 | Rapp et al. |
| 7,376,321 B2 | 5/2008 | Bolster et al. |
| 7,376,322 B2 | 5/2008 | Zimmel et al. |
| 7,555,193 B2 | 6/2009 | Rapp et al. |
| RE41,460 E | 7/2010 | Wheeler |
| 7,822,313 B2 | 10/2010 | Rapp et al. |
| 7,983,521 B2 | 7/2011 | Rapp et al. |
| 8,358,900 B2 | 1/2013 | Rapp et al. |
| 2003/0095772 A1 | 5/2003 | Solheid et al. |
| 2005/0003697 A1 | 1/2005 | Neer et al. |
| 2005/0048831 A1 | 3/2005 | Neer et al. |
| 2006/0029353 A1 | 2/2006 | Bolster et al. |
| 2006/0093301 A1 | 5/2006 | Zimmel et al. |
| 2006/0269205 A1 | 11/2006 | Zimmel |
| 2006/0269206 A1 | 11/2006 | Zimmel |
| 2007/0047893 A1 | 3/2007 | Kramer et al. |
| 2010/0322577 A1 | 12/2010 | Bolster et al. |
| 2011/0217017 A1* | 9/2011 | Drouard et al. ............... 385/135 |
| 2012/0230644 A1* | 9/2012 | Marmon et al. ............... 385/135 |

FOREIGN PATENT DOCUMENTS

| | | |
|---|---|---|
| DE | 27 35 106 A1 | 2/1979 |
| DE | 33 08 682 A1 | 9/1984 |
| DE | 42 29 510 A1 | 3/1994 |
| EA | 0 406 151 A2 | 1/1991 |
| EP | 0 146 478 A2 | 6/1985 |
| EP | 0 149 250 A2 | 7/1985 |
| EP | 0 196 102 A2 | 10/1986 |
| EP | 0 211 208 A1 | 2/1987 |
| EP | 0 479 226 A1 | 4/1992 |
| EP | 0 196 102 B1 | 3/1993 |
| EP | 0 538 164 A1 | 4/1993 |
| EP | 0 697 610 A1 | 2/1996 |
| EP | 0 871 047 A1 | 10/1998 |
| FR | 2 531 576 A1 | 2/1984 |
| FR | 2 587 127 A1 | 3/1987 |
| JP | 59-74523 | 4/1984 |
| JP | 60-169811 | 9/1985 |
| JP | 61-55607 | 3/1986 |
| JP | 61-90104 | 5/1986 |
| WO | WO 91/10927 | 7/1991 |
| WO | WO 00/05611 | 2/2000 |
| WO | WO 00/52504 | 9/2000 |

OTHER PUBLICATIONS

"ITU Fiber Handbook" with English Translation, 14 pages, Mar. 1992.

"OMX™ 600 Optical Distribution Frame," *ADC Telecommunications, Inc.*, Publication No. 854, front cover, table of contents, pp. 1-13, rear cover (Apr. 2000).

"Precision Mechanical" with English Translation, 5 pages.

ADC Telecommunications brochure entitled "Fiber Cable Management Products, Second Edition," 149 pages, dated Oct. 1995.

ADC Telecommunications brochure entitled "FL2000 Products," 48 pages, dated Nov. 1996.

ADC Telecommunications brochure entitled "Next Generation Frame (NGF) Product Family Ordering Guide," 22 pages, dated Oct. 1998.

ADC Telecommunications Next Generation Frame (NGF) Product Family, 8 pages, dated Dec. 2000.

ADC Telecommunications, Inc., 600 mm Products copied brochure, Value-Added Module System, Oct. 2003, pp. 53-78.

ADC Telecommunications, Inc., copied product brochure, Fiber Management Tray, Mar. 2003, pp. 1-8.

ADC Telecommunications, Inc., FMT Micro Value Added Monitor Module Configuration Scheme, Feb. 6, 2003, pp. 1-2.

ADC Telecommunications, Inc., Mini VAM Connector Cleaning Instructions, ADCP-90-412, Issue 3, Sep. 2002, pp. 1-8.

ADC Telecommunications, Inc., Mini VAM Splitter Mod (Installation Drawing), Drawing No. 1128185, technical drawing of the VAM pictured in Exhibit D, Mar. 14, 2001, 2 page.

ADC Telecommunications, Inc., Next Generation Frame (NGF) Product Tour, Value Added Modules (VAMs), Copyright 2003, (admitted as offered for sale as of the effective filing date of this application), 1 page.

AT&T Product Bulletin 2987D-DLH-7/89 Issue 2 (Copyright 1989).

Complaint relating to Civil Action No. 5:11-cv-02509-JS, *ADC Telecommunications, Inc v. Opterna Am, Inc.* filed Apr. 11, 2011 (14 pages).

Complaint relating to Civil Action No. 1:11cv-735 (GBL-IDD), *ADC Telecommunications, Inc v. Opterna Am, Inc.* filed Jul. 12, 2011 (6 pages).

(56) References Cited

OTHER PUBLICATIONS

Installation Instructions for 12-position Splice Protector Insert from Corning Cable Systems, SRP-001-276, Issue 4, Jul. 2001, 1 page.
Jumper Routing Procedure for Enhanced Management Frame, Corning Cable Systems, SRP-003-599, Issue 2, Apr. 2002, 4 pages.
Northern Telecom Bulletin #91-004, Issue #2, May 1991.
Plaintiff's Notice of Dismissal relating to Civil Action No. 5:11-cv-02509-JS, *ADC Telecommunications, Inc* v. *Opterna Am, Inc.* filed Jul. 12, 2011 (1 page).
Stipulation and Order of Dismissal relating to Civil Action No. 1:11-cv-735-GBL-IDD, *ADC Telecommunications, Inc* v. *Opterna Am, Inc.* filed Feb. 21, 2012 (2 pages).

\* cited by examiner

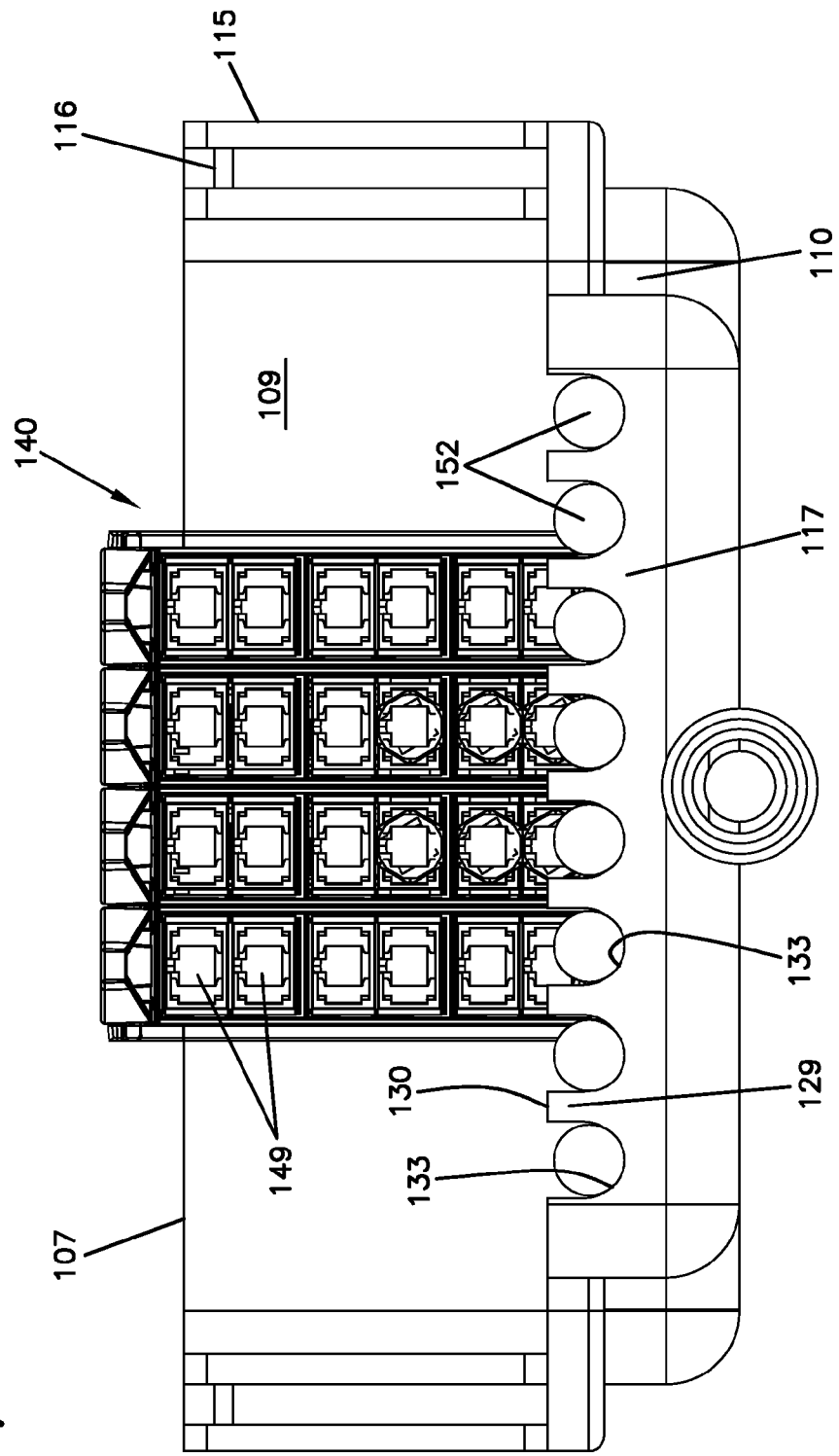

OUTSIDE PLANT TERMINATION ENCLOSURE

CROSS REFERENCE TO RELATED APPLICATIONS

This application claims the benefit of U.S. Provisional Application No. 61/539,851, filed Sep. 27, 2011, and titled "Outside Plant Termination Enclosure" the disclosure of which is hereby incorporated herein by reference.

TECHNICAL FIELD

The present disclosure relates to telecommunications enclosures, and more particularly, to telecommunications enclosures including sliding adapter modules for optically coupling fiber optic cables.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wavelength division multiplexers.

It is often preferred for telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures. Telecommunications enclosures are typically sealed to inhibit the intrusion of moisture or other contaminants.

SUMMARY

Aspects of the disclosure are directed to telecommunications apparatus including an enclosure having an enclosure base and an enclosure cover that join together at a sealed interface that extends about a perimeter of the enclosure. The base defines a majority of the sidewall at a first end of the enclosure and the cover defines a majority of the sidewall at a second end of the enclosure.

Aspects of the disclosure also are directed to a seal interface between first and second enclosure pieces of an enclosure. The seal interface extends about a perimeter of the enclosure.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 is a front elevational view of the base of FIG. 5.

DETAILED DESCRIPTION

Figure 1:
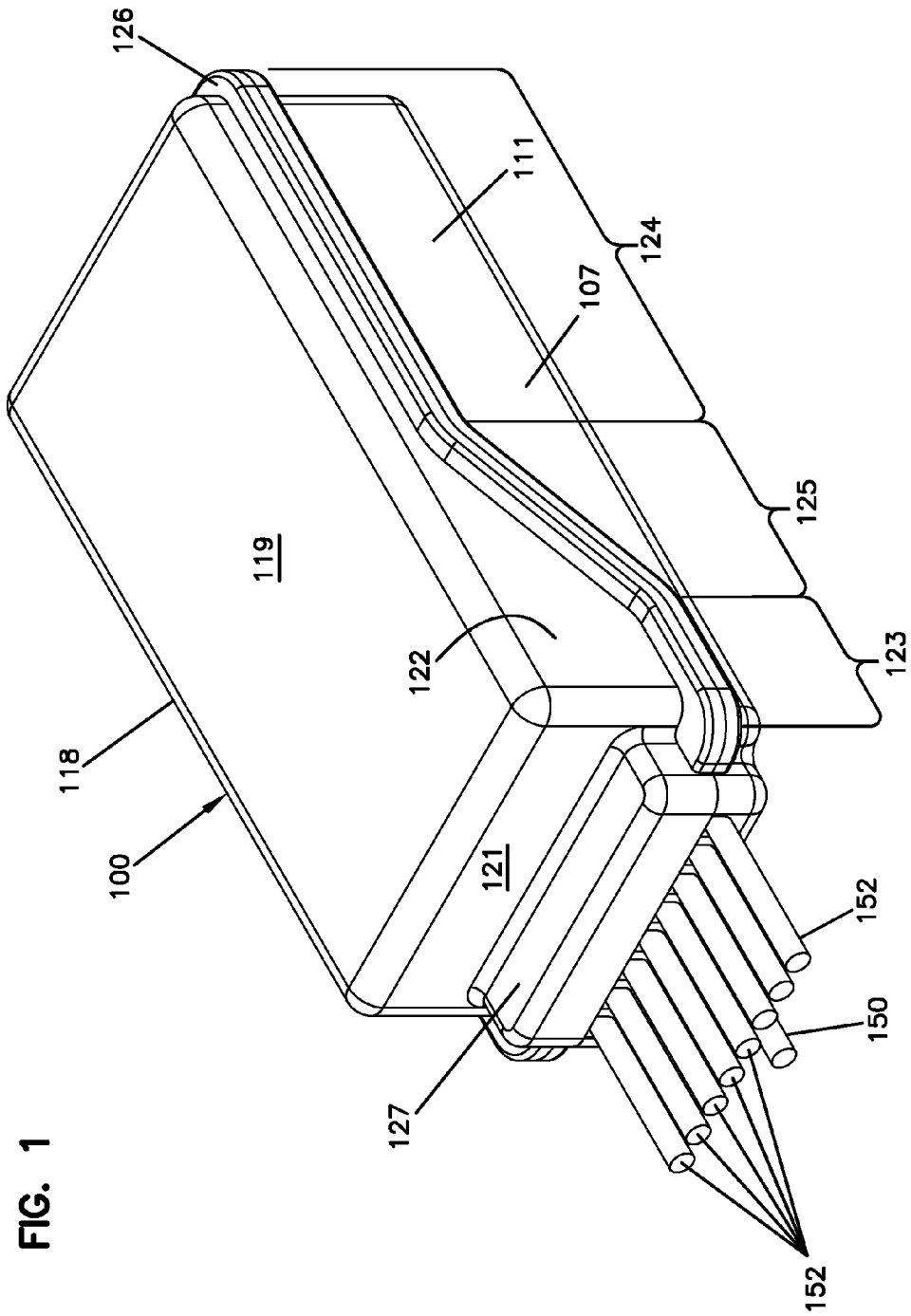
FIG. 1 is a front, top perspective view of an example enclosure having a base and a cover with drop cables extending through a front of the enclosure.
Figure 2:
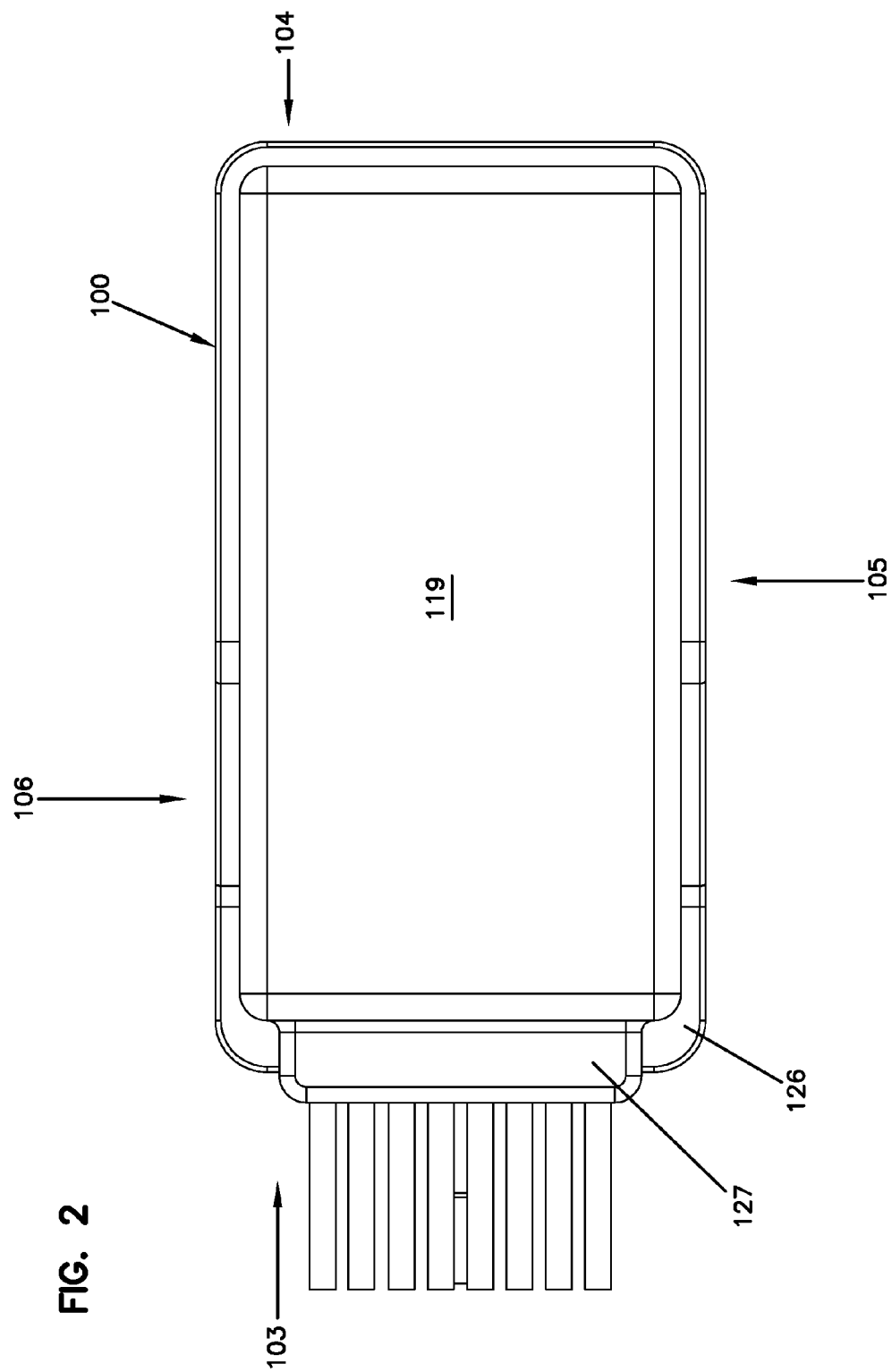
FIG. 2 is a top plan view of the enclosure of FIG. 1.

Reference will now be made in detail to exemplary aspects of the present disclosure that are illustrated in the accompanying drawings. Wherever possible, the same reference numbers will be used throughout the drawings to refer to the same or like parts.

The disclosure is directed to a termination enclosure for optical fiber cables. One or more optical components (e.g., sliding modules, splice trays, splitters, adapter panels, connector holder panels, etc.) are disposed within an interior of the enclosure. In some implementations, the optical components include sliding modules. In certain implementations, the sliding modules include one or more adapter packs. In certain implementations, the sliding modules include one or more parking modules. In certain implementations, the sliding modules include one or more optical splitters.

The termination enclosure can be initially empty when deployed. The desired number and type of optical components may be added or removed subsequent to deployment as needed. One or more optical components may be subsequently changed as needed (e.g., one type of component being switched for another type of component). In other implementations, the termination enclosure may be deployed with one or more of the optical components. Variations as to the number of modules and combinations of the module types are possible to suit the network needs.

The termination enclosure includes a sealed input port and a plurality of sealed output ports that provide access to an interior of the enclosure. In certain implementations, the sealed input port and sealed output ports are located on a common side of the termination enclosure. In certain implementations, the termination enclosure defines a plurality of sealed input ports. In certain implementations, a feeder cable is precabled through the sealed input port prior to deployment of the termination enclosure.

As used herein, the terms "input" and "output" are used for convenience and are not intended to be exclusory. Optical signals carried over optical fibers may travel in either or both directions. Accordingly, optical fibers routed through the input port may carry input and/or output signals. Likewise, the optical fibers routed through any of the output port may carry input and/or output signals.

In addition, while the illustrated example has only one input cable and multiple output cables, other implementations may include multiple input cables and multiple output cables. The termination enclosure may be referred to as an integrated closure terminal.

The enclosure 100 has a top 101, a bottom 102, a front 103, a rear 104, a first side 105, and a second side 106. A base 107 forms the bottom 102 of the enclosure 100 and a cover 118 forms the top 101 of the enclosure 100. The base 107 forms the majority of the rear 104 of the enclosure 100 and the cover 118 forms the majority of the front 103 of the enclosure 100.

The base 107 and cover 118 cooperate to forms the sides 105, 106 of the enclosure 100. The base 107 includes a bottom wall 108, a rear wall 109, a front wall 110, and side walls 111. The cover 118 includes a top wall 119, a rear wall 120, a front wall 121, and side walls 122.

In some implementations, the enclosure 100 is configured to be deployed in a handhole. In other implementations, the enclosure 100 is configured to be deployed at a pedestal. In other implementations, the enclosure 100 is configured to be deployed on a pole. In other implementations, the enclosure 100 is configured for aerial strand mount installation.

In some implementations, the cover 118 is movably coupled to the base 107. In certain implementations, the cover 118 is pivotally coupled to the base 107. For example, the cover 118 may be movable relative to the base 107 between a closed position and an open position. The cover 118 inhibits access to the interior of the enclosure 100 when in the closed position and allows access to the interior when in the open position. In certain implementations, a rear wall 120 of the cover 118 is hinged to the rear wall 109 of the base 107. In other implementations, the cover 118 is detachably coupled to the base 107 (e.g., by clamps, fasteners, latches, etc.).

The sides 105, 106 of the base 107 are taller towards the rear 104 and shorter towards the front 103 of the enclosure 100. In particular, the sides 105, 106 of the base 107 define a high section 112, a low section 113, and a transition section 114 (see FIG. 4). At least the high section 112 and rear 104 of the base 107 provide protection for optical components disposed within the enclosure 100 when the cover 118 is opened or removed from the base 107. The low section 113 and the front 103 of the base 107 facilitate access to the optical components when the cover 118 is opened or removed from the base 107. In certain implementations, the side walls 105, 106 of the base 107 remain tall along a majority of the length of the enclosure 100. In one implementation, the side walls 105, 106 of the base 107 remain tall along a length of the optical components.

A seal, such as a gasket, a gel-filled perimeter cavity, or a sealing ring may be disposed between the base 107 and the cover 118 around the perimeter of the enclosure 100. The seal inhibits dirt, water, or other contaminants from entering the enclosure 100 when the cover 118 is secured to the base 107. In some implementations, the base 107 includes a rim 115 that defines a gasket channel 116 in which the gasket may seat. The cover 118 also includes a rim 126 that aligns with the rim 115 of the base 107. In certain implementations, the rim 126 of the cover 118 also defines a gasket channel in which the gasket or a portion thereof may seat. In other implementations, the rim 126 of the cover may form a tongue that extends downwardly into the gasket channel 116 of the base rim 115 to compresses the gasket in the channel 116. In still other implementations, the cover 118 may define the channel and the base 107 may define the tongue. The seal may be fixed or removable.

Figure 5:
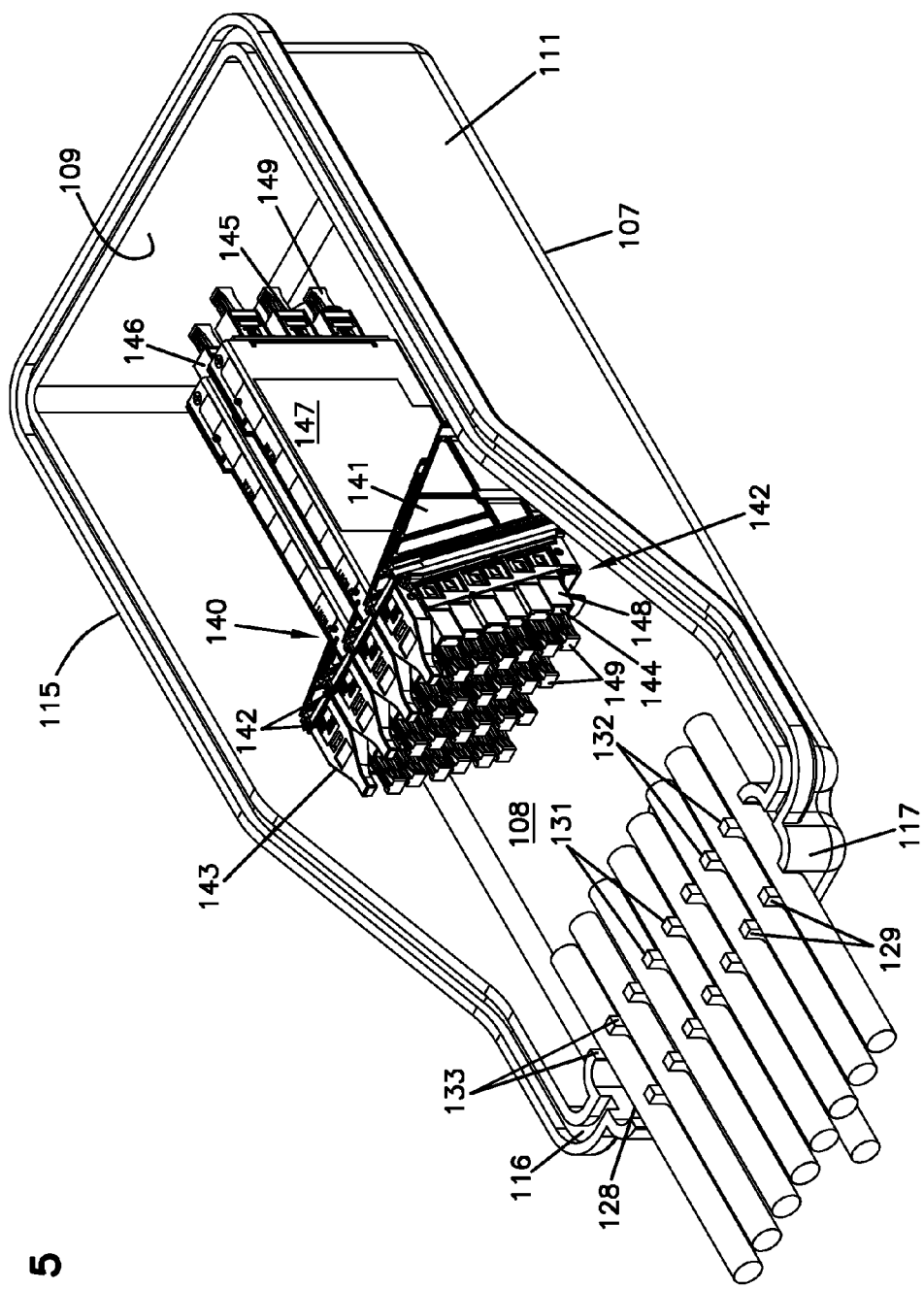
FIG. 5 is a front, top perspective view of the base of FIG. 1 with the cover removed so that a sliding module arrangement is visible.

As shown in FIG. 5, the gasket channel 116 extends along the perimeter of the enclosure 100 in a non-planar route. The side walls 111 of the base 107 are higher at the rear 104 of the enclosure 100 and lower at the front 103 of the enclosure 100. The higher wall sections 112 at the rear 104 define a first plane along which a first section of the gasket channel 116 extends and the lower wall sections 113 at the second end 115 define a second plane along which a second section of the gasket channel 116 extends. The transition sections 114 of the base side walls 111 define a transitional section of the gasket channel 116.

Cable ports at located at the front 103 of the enclosure 100. The rear 104 of the enclosure 100 is generally solid (i.e., does not define cable ports). In certain implementations, the cover 118 attaches to the base 110 at the rear 104. In some implementations, the termination enclosure 100 includes a dedicated input member 135 defining a sealed passage 139 through which a feeder cable 150 may extend into the interior of the enclosure 100. In some implementations, the input member 135 protrudes forwardly of the enclosure 100 (see FIG. 4). In certain implementations, the input member 135 protrudes forwardly from the base 107. In other implementations, the input member 135 may protrude forwardly from the cover 118.

Figure 4:
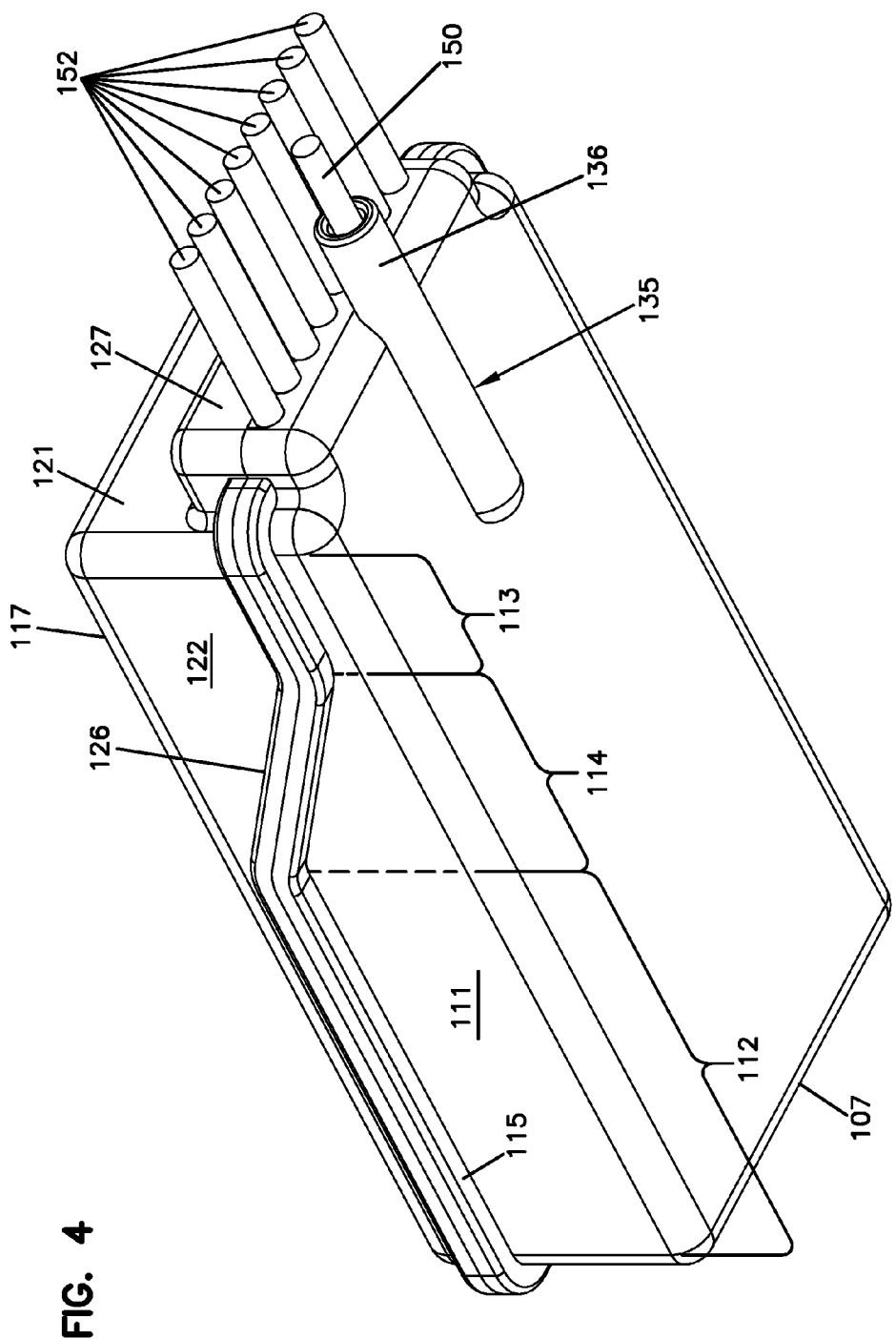
FIG. 4 is a front, bottom perspective view of the enclosure of FIG. 1 in which a stub feeder cable is visible.
Figure 6:
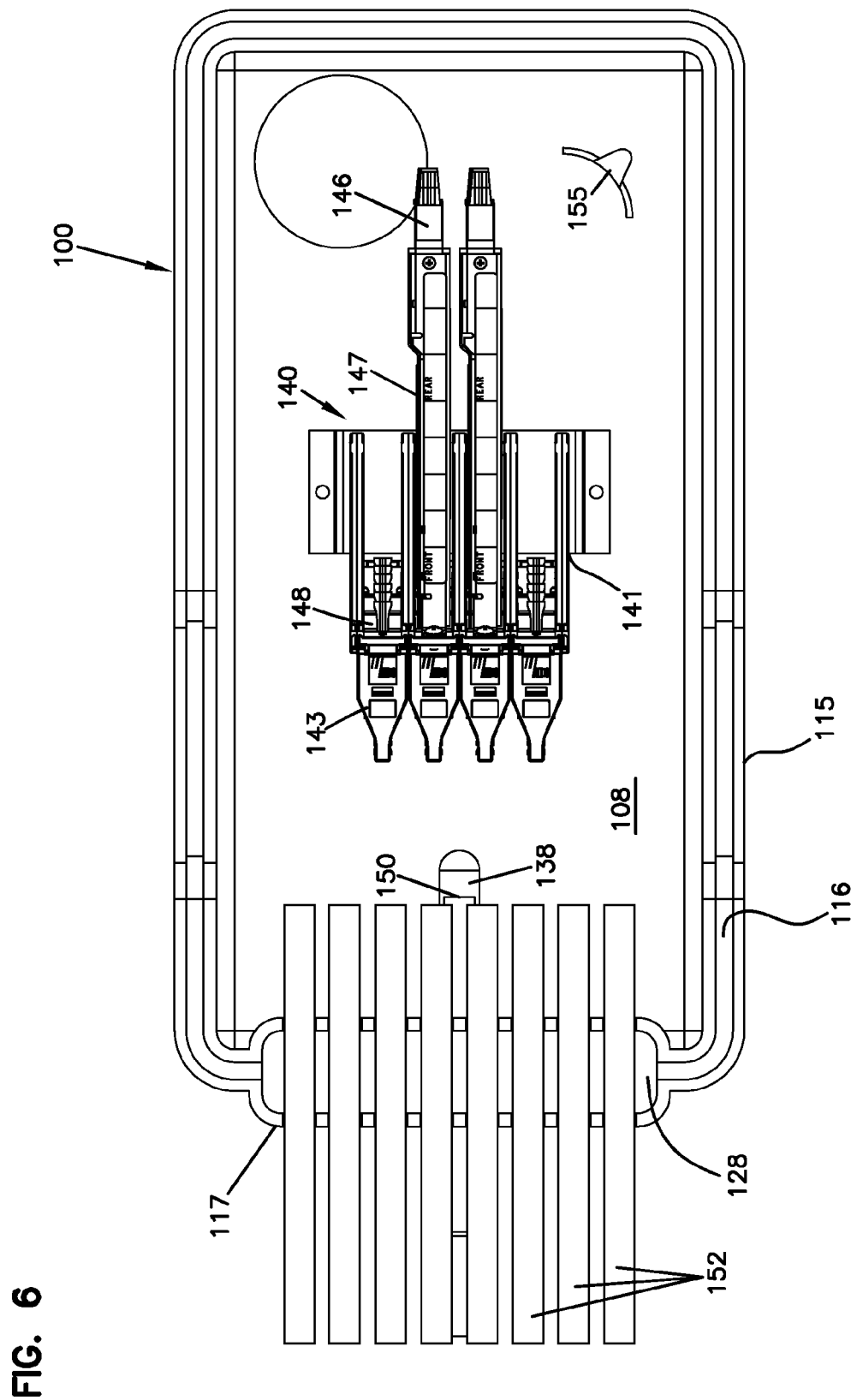
FIG. 6 is a top plan view of the base of FIG. 5.

In certain implementations, the input member 135 includes an annular wall 136 that defines an input port 137 leading to the sealed passage 139 (see FIG. 4). In certain implementations, the annular wall 136 forms the portion of the input member 135 protruding forwardly. As shown in FIG. 6, the input member 135 terminates at an interior port 138 through which the feeder cable 150 may enter the interior of the enclosure 100. In some implementations, the interior port 138 is defined in the bottom surface of the base 107. In other implementations, the interior port 138 may be defined in the front wall 110 of the base 107.

In some implementations, the feeder cable 150 includes a stub cable that is installed (e.g., at the factory) prior to deployment of the enclosure 100. After installation, the stub feeder cable 150 has a first end that is disposed within the interior of the enclosure 100, an intermediate section that extends through the input member 135, and a second end that is disposed outside the enclosure 100. The stub feeder cable 150 is sufficiently long to reach a cabinet, pedestal, drop terminal, splice enclosure, handhole, or other connection point at which the stub feeder cable 150 is optically coupled to a communications network. In certain implementations, a length of the stub feeder cable 150 ranges from about fifty feet to about one hundred feet long. In other implementations, the stub feeder cable 150 may range from about forty feet to about eighty feet. In other implementations, the stub feeder cable 150 may range from about eighty feet to about 120 feet. In still other implementations, the stub feeder cable 150 may have an even greater or lesser length.

In some implementations, the stub feeder cable may include a single optical fiber. In other implementations, the stub feeder cable 150 may include multiple optical fibers (e.g., two, eight, twelve, twenty-four, etc.). In some implementations, the stub feeder cable 150 may be terminated at a first end with one or more connectors. For example, in some implementations, the stub feeder cable 150 may include a single optical fiber terminated with a single optical connector (e.g., SC connector, LC connector, LX.5 connector, FC connector, ST connector, etc.). In other implementations, the stub feeder cable 150 may have multiple fibers terminated by a multi-fiber connector (e.g., MPO connector) at the first end. In still other implementations, the stub feeder cable 150 may have multiple fibers each separately terminated by a single optical connector at the first end. The connector(s) at the first end (i.e., the end located outside of the enclosure 100) may be ruggedized (e.g., environmentally sealed) optical connectors. The second end of the stub feeder cable 150 (i.e., the end located inside of the enclosure 100) may be terminated or unterminated.

In some implementations, the base 107 and cover 118 define sealing regions 117, 127 at the front 103 of the enclosure 100. The sealing regions 117, 127 cooperate to define a sealing chamber 128 through which at least one drop cable 152 may extend to enter/exit the enclosure 100. A gasket or other sealing arrangement is disposed in the sealing chamber 128 to provide an environmental seal about each drop cable 152 extending into the enclosure 100. In certain implementations, the gasket or other sealing arrangement is configured to provide retention of the drop cables 152 even when the cover 118 is opened or removed from the base 107.

Figure 3:
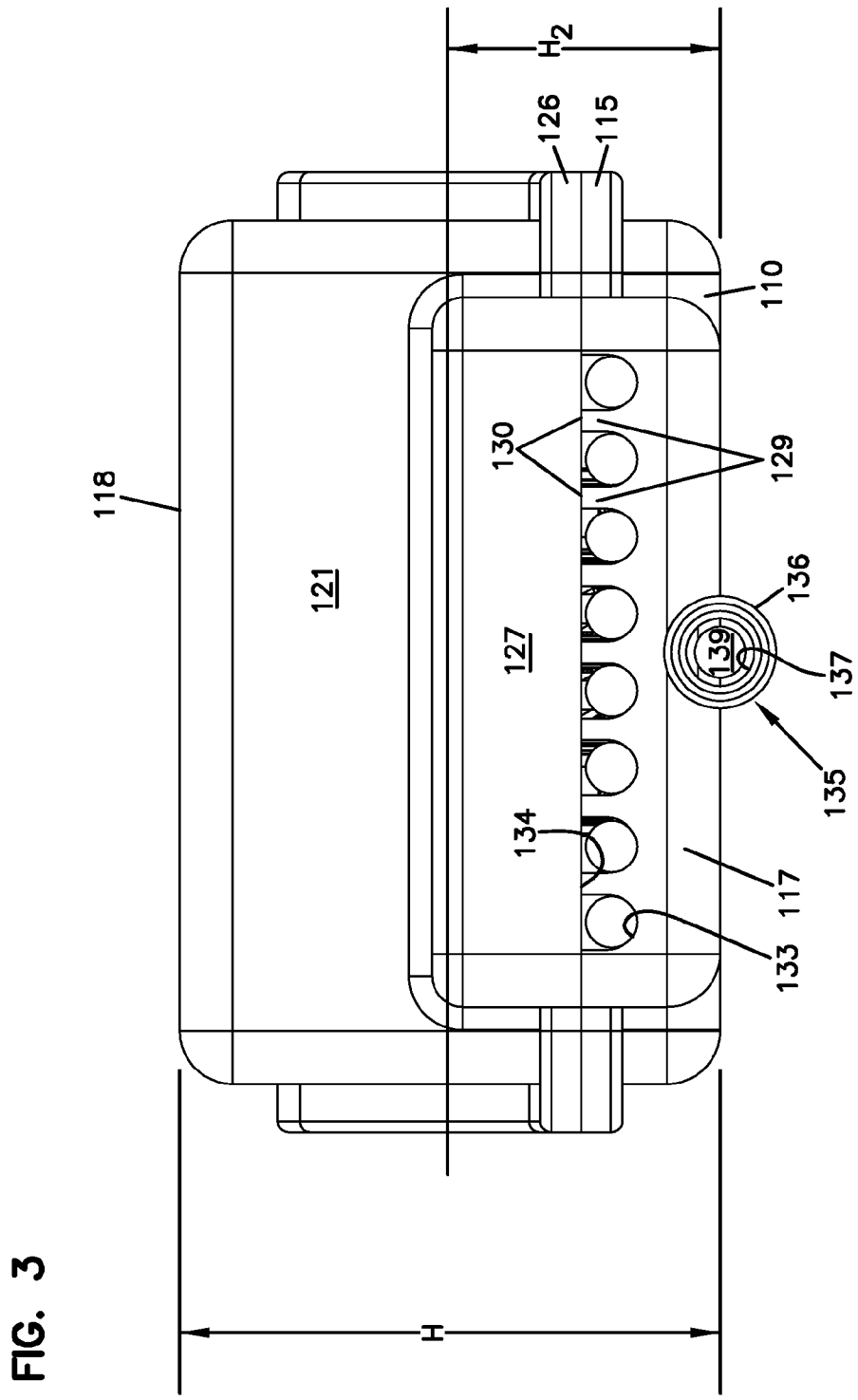
FIG. 3 is a front elevational view of the enclosure of FIG. 1.

In some implementations, each of the base 107 and cover 118 may taper inwardly to define a smaller section protruding forwardly from front walls 110, 121 of the base 107 and cover 118, respectively. The sealing region 117, 127 of at least one of the base 107 and the cover 118 defines one or more channels 133 sized to enable one or more drop cables 152 to extend into the enclosure 100. In the example shown in FIG. 5, the sealing region 117 of the base 107 includes outer fingers 129 and inner fingers 131 defining the channels 133. In the example shown, the fingers 129, 131 have squared tops 130, 132 that engage a straight edge 134 of the cover 118 (see FIG. 3). In other implementations, longitudinal ribs or single fingers may separate the channels 133. In still other implementations, the cover sealing region 127 may form the channels 133. In still other implementations, the channels 133 may be defined by the gasket arrangement or other seal.

In some implementations, cable clamping and strain-relief protection is provided within the enclosure 100 for the cables routed into the enclosure 100. For example, one or more cable clamping and strain-relief arrangements may be provided adjacent the inner fingers 131. In other implementations, the cable clamping and strain-relief arrangements may be provided in the gasket chamber 128 or other seal. In certain implementations, the drop cables 152 remain strain-relieved when the cover 118 is opened or removed from the base 107.

The drop cables 152 may be added to or removed from the enclosure 100 without disrupting previously added drop cables 152. The sealing chamber 128 is separate from the cable input member 135. Accordingly, the drop cables 152 may be added to or removed from the enclosure 100 without disrupting the feeder cable 150. Each enclosure 100 has capacity to retainer a particular number of drop cables 152. In some implementations, the enclosure 100 is cabled with only a subset of its capacity when deployed. One or more additional drop cables 152 may be added after deployment.

For example, to add a drop cable, the cover 118 may be opened and the drop cable 152 to be added may be inserted through the gasket arrangement or other seal and laid in an empty channel 133 across the sealing chamber 128. To remove a drop cable, the cover 118 may be opened and the drop cable 152 to be removed may be pulled through or otherwise removed from the gasket. In certain implementations, a drop cable 152 may be removed and replaced with a different drop cable.

In some implementations, the feeder input member 135 is disposed beneath the sealing chamber 128 for the drop cables 152. In certain implementations, both the feeder input member 135 and the sealing chamber 128 are disposed within a lower half H2 of the height H of the enclosure 100 (see FIG. 3). Indeed, in certain implementations, both the feeder input member 135 and the sealing chamber 128 are disposed within a lower third of the height H of the enclosure 100 (see FIG. 3). Indeed, in certain implementations, at least the feeder input member 135 is disposed within a lower quarter of the height H of the enclosure 100 (see FIG. 3). In certain implementations, the sealing chamber 128 also may be disposed within the lower quarter of the height H. As shown in FIG. 5, disposing the input member 135 and drop cables 152 in the lower portion of the enclosure 100 enhances access to the communications components located within the enclosure 100.

FIGS. 5-7 show one example implementation of an optical component arrangement disposed within the interior of the example base 107. In some implementations, the optical component arrangement includes one or more adapter arrangements. For example, in some implementations, the optical component arrangement includes a panel holding one or more fiber optic adapters at which connectorized ends of the feeder cable 150 may be coupled to connectorized ends of the drop cables 152. In other implementations, the optical component arrangement includes one or more stationary adapter modules. In still other implementations, the optical component arrangement includes one or more connector holders, which may be mounted to a storage panel or one or more stationary storage modules. In still other implementations, the optical component arrangement includes one or more splice trays. In still other implementations, the optical component arrangement includes one or more splitter modules.

In other implementations, the optical component arrangement includes a sliding module arrangement 140. The sliding module arrangement 140 includes a frame assembly 141 and at least one module 142 that is configured to slide relative to the frame assembly 141. In the example shown in FIGS. 5-7, the sliding module arrangement 140 includes four modules 142 mounted to the frame assembly 141. In other implementations, however, the sliding module arrangement 140 may include a greater or lesser number of modules 142 (e.g., one module, two modules, five modules, six modules, eight modules, etc.).

In certain implementations, each sliding modules 142 moves independently of each other sliding module 142. In certain implementations, each sliding module 142 may move to a different position in order to facilitate access to the module 142. For example, each sliding module 142 may move to a raised or extended position relative to the other modules to provide sufficient finger room to grasp or otherwise manipulate fiber optic connectors at the ports of the module 142. In some implementations, each of the sliding modules 142 includes a latch or other locking member 143 that secures the sliding module 142 in at least one position relative to the frame assembly 141. In certain implementations, the sliding modules 142 may be secured in a plurality of positions (e.g., up, down, an intermediate position, etc.).

In some implementations, the sliding modules 142 define front ports 144 and rear ports 145 for receiving optical connectors. In certain implementations, the sliding modules 142 include adapters 146 that each define one or more of the front ports 144 and one or more of the rear ports 145. In the example shown, the sliding module 142 includes six adapters 146. In other implementations, the sliding module 142 may include a greater or lesser number of adapters 146 (e.g., four, eight, ten, or twelve). In certain implementations, the adapters 146 of a certain type of sliding module 142 are aligned linearly along the module 142. In certain implementations, the adapters 146 are aligned along a direction of travel. In certain implementations, the adapters 146 form a staggered or stepped configuration along the module 142. Example adapter dust caps 149 are shown disposed in the adapters.

The adapters 146 align connector ferrules received at the front ports 144 with connector ferrules received at the respective rear ports 145. In certain implementations, the adapters 146 are configured to receive SC-type fiber optic connectors. In certain implementations, the adapters 146 are configured to receive LC-type fiber optic connectors. In certain implementations, the adapters 146 are configured to receive MPO-type fiber optic connectors. In certain implementations, the adapters 146 are configured to receive LX.5-type fiber optic connectors. In other implementations, the adapters 146 may be configured to receive any desired type fiber optic connectors.

Additional details pertaining to sliding adapter packs that may be used with or incorporated into sliding modules 142 can be found in U.S. Pat. Nos. 5,497,444, 5,717,810, 6,591, 051, and 7416349, the disclosures of which are hereby incorporated by reference herein.

In some implementations, the sliding modules 142 include telecommunication modules that include a housing 147 having front ports 144 and rear ports 145. In some implementations, the front ports 144 are defined by adapters disposed at a front of the housing 147 and the rear ports 145 are defined by adapters disposed at a rear of the housing 147. In other implementations, the ports of the housing 147 include openings or passages leading to the interior of the housing 147.

In the example shown, each module 142 has three rear ports 145 configured to receive input optical signals, three front ports 144 configured to provide access to output optical signals, and three front ports 144 configured to provide monitoring optical signals. In some implementations, additional optical circuitry is disposed within the housing 147 of the telecommunication modules. For example, one example type of telecommunication module may include one or more optical splitters to split optical signals. Another example type of telecommunication module may include a wave division multiplexer. In other implementations, the telecommunication module may include a splice tray or cassette.

In other implementations, another type of sliding module 142 may include one or more connector holders for storing unused fiber optic connectors. For example, in some implementations, one or more optical fiber connectors (e.g., LC-type connectors, SC-type connectors, MPO-type connectors, etc.) of the feeder cable 150 may be stored at the connector holders 148 until needed for service. In other implementations, one or more optical fiber connectors of the drop cables 152 may be stored at the connector holders 148 until needed. When needed, the connectors may be removed from the connector holders 148 and plugged into the front or rear ports 144, 145 of the sliding module arrangement 140. In some implementations, the connector holders 148 are sized to receive the fiber optic connectors while dust caps are disposed over the ferrules of the fiber optic connectors.

Additional details pertaining to connector holders that may be used with or incorporated into sliding modules 142 can be found in U.S. Pat. Nos. 7,583,883, 7,233,731, 7,198,409, and 7277620, the disclosures of which are hereby incorporated by reference herein.

In the example shown in FIGS. 5-7, the two middle sliding modules 142 include telecommunication module having six adapters 146 defining front ports 144 and three adapters 146 defining rear ports 145 and the two outer sliding modules 142 include six connector holders 148.

In some implementations, one or more of the sliding modules 142 may be removed after deployment of the enclosure 100. In certain implementations, one or more of the sliding modules 142 may be replaced with other sliding modules 142. For example, a connector holder type sliding module 142 may be removed and replaced with a telecommunications module type sliding module 142 to increase termination capacity of the enclosure 100. Alternatively, a telecommunications module type sliding module 142 may be replaced with an adapter pack or with a connector holder type module.

In some implementations, cable management structures may be provided within the interior of the enclosure 100 to facilitate cable routing and/or accommodate storage of slack length of the feeder and drop cable fibers. Bend radius limiters, cable spools, cable retention fingers, cable tie downs, or other cable management structures may be disposed within interior of the enclosure 100 to guide optical fibers to the optical components and/or to provide slack storage of the optical fibers. For example, one or more bend radius limiters 155 (FIG. 6) may be disposed within the interior of the enclosure 100 to enable slack fiber length to wrap one or more times around the sliding module arrangement 140.

In some implementations, the cable management structures guide one or more fibers of the feeder cable 150 to one or more front ports 144 of the sliding modules 140. In other implementations, the cable management structures guide one or more fibers of the feeder cable 150 to one or more rear ports 145 of the sliding modules 140. In some implementations, the cable management structures guide one or more fibers of the drop cables 152 to one or more front ports 144 of the sliding modules 140. In other implementations, the cable management structures guide one or more fibers of the drop cables 152 to one or more rear ports 145 of the sliding modules 140.

In the example shown in FIG. 5, the sliding modules 142 are disposed within the interior in alignment with the high sections 112 of the base side walls 111. Accordingly, the base side walls 111 provide protection for the sliding modules 142 and optical fibers routed around the sliding modules 142. Also in the example shown in FIG. 5, the sealing chamber 128 at which the drop cables 152 are disposed is provided at the low section 113 of the side walls 111. Accordingly, the side walls 111 are configured to provide enhanced access to the sealing chamber 128, gasket arrangement, and drop cables 152.

The above specification provides a complete description of the present invention. Since many embodiments of the invention can be made without departing from the spirit and scope of the invention, certain aspects of the invention reside in the claims hereinafter appended.

What is claimed is:

1. A termination enclosure for optical fiber cables comprising:
   a base defining a bottom of the termination enclosure and partially defining sidewalls of the enclosure extending upwardly from the bottom;
   a cover moveably coupled to the base to provide access to an interior of the enclosure, the cover defining a top of the termination enclosure and partially defining the sidewalls of the enclosure extending downwardly from the top;
   at least one optical component disposed within the interior;
   an input member that extends outwardly from the base, at least a portion of the input member extending along the bottom of the termination enclosure, the input member defining a sealed input passage that extends through the base, the sealed input passage extending between an outer port at a distal end of the input member and an inner port that provides access to the interior of the enclosure from the input passage; and
   a sealing chamber defined by the base and cover at which a gasket is disposed to seal a plurality of drop cables routed through the enclosure, the gasket being configured to provide retention of the drop cables even when the cover is moved relative to the base, the sealing chamber defining ports through which the drop cables are routed into the interior, the ports and the outer port of the sealed input passage being located at a common side of the termination enclosure.

2. The termination enclosure of claim 1, wherein the optical component includes a sliding module.

3. The termination enclosure of claim 2, wherein the sliding module includes one or more adapter packs.

4. The termination enclosure of claim 2, wherein the sliding module includes one or more parking modules.

5. The termination enclosure of claim 2, wherein the sliding module includes one or more optical splitters.

6. The termination enclosure of claim 1, wherein a rear of the enclosure is generally solid and the cover attaches to the base at the rear of the enclosure.

7. The termination enclosure of claim 1, wherein the inner port is defined through the bottom of the termination enclosure.

8. The termination enclosure of claim 1, wherein the inner port is defined through a front of the termination enclosure.

9. The termination enclosure of claim 1, further comprising a feeder cable precabled through the sealed input passage prior to deployment of the termination enclosure.

10. The termination enclosure of claim 9, wherein the feeder cable is a stub cable that has a first end that is disposed within the interior of the enclosure, an intermediate section that extends through the input passage, and a second end that is disposed outside the enclosure.

11. The termination enclosure of claim 10, wherein a length of the stub feeder cable ranges from about fifty feet to about one hundred feet.

12. The termination enclosure of claim 10, wherein a length of the stub feeder cable ranges from about forty feet to about eighty feet.

13. The termination enclosure of claim 10, wherein a length of the stub feeder cable ranges from about 80 feet to about 120 feet.

14. The termination enclosure of claim 10, wherein the stub feeder cable includes multiple optical fibers.

15. The termination enclosure of claim 10, wherein a first end of the stub feeder cable located within the interior of the enclosure is terminated by at least one optical connector.

16. The termination enclosure of claim 15, wherein a second end of the stub feeder cable is unterminated.

17. The termination enclosure of claim 15, wherein a second end of the stub feeder cable is terminated by at least one single fiber connector.

18. The termination enclosure of claim 15, wherein a second end of the stub feeder cable is terminated by at least one multi-fiber connector.

19. The termination enclosure of claim 15, wherein a second end of the stub feeder cable is terminated by a ruggedized connector.

20. The termination enclosure of claim 1, wherein the sidewalls of the base are taller towards a rear of the enclosure and shorter towards a front of the enclosure.

\* \* \* \* \*